Patented Oct. 17, 1944

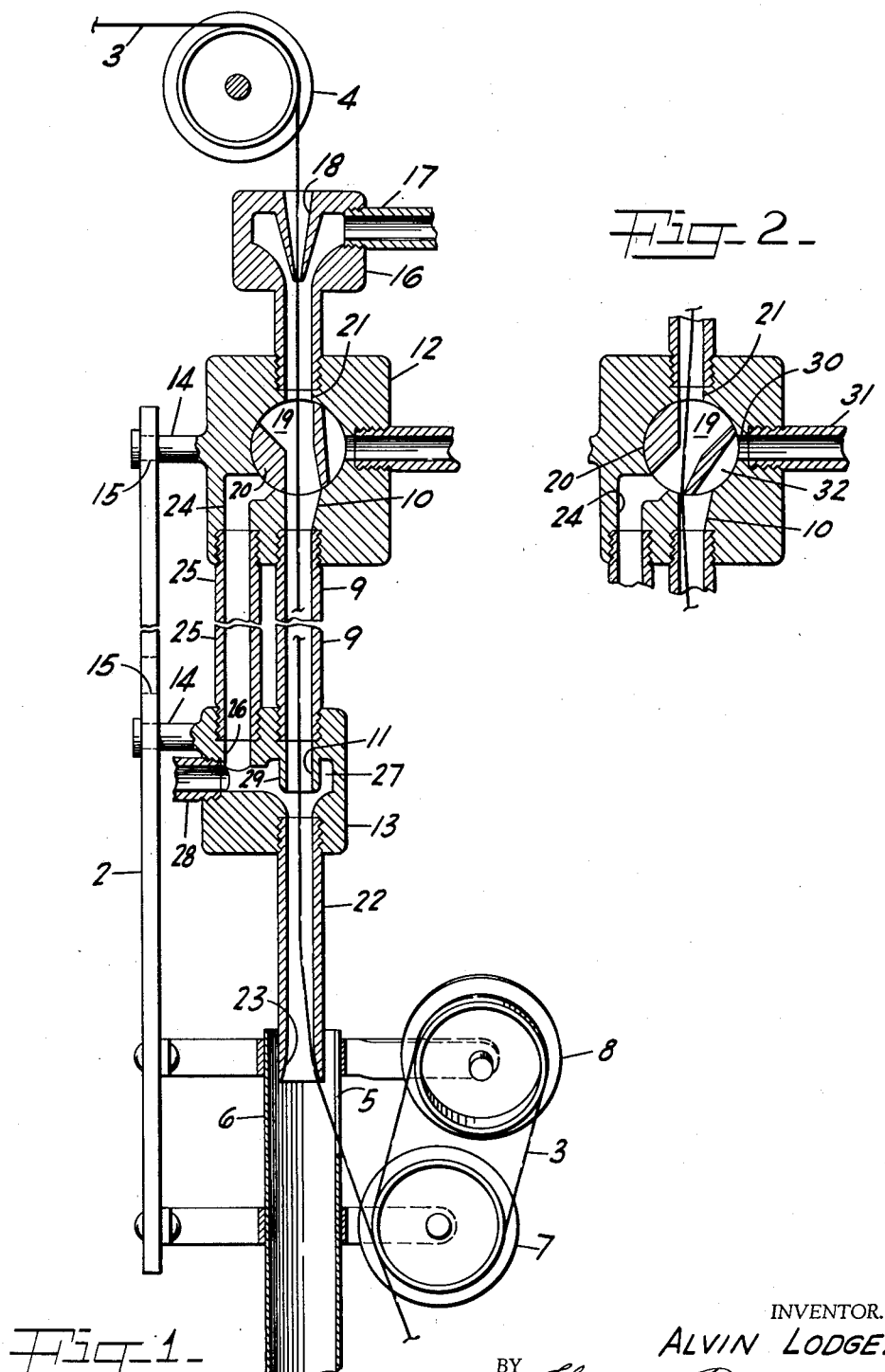

2,360,352

UNITED STATES PATENT OFFICE 2,360,352

FLUID TREATMENT OF FILAMENTARY MATERIAL AND APPARATUS THEREFOR

Alvin Lodge, Meadville, Pa., assignor to American Viscose Corporation, Wilmington, Del., a corporation of Delaware Application August 26, 1942, Serial No. 456,290

13 Claims. (Cl. 8—151)

This invention relates to a method and apparatus for the treatment of filamentary material with fluids and is particularly concerned with the continuous treatment of running lengths of filamentary material with fluids under high pressures.

It is an object of this invention to provide in such systems a novel method and arrangement for substantially confining a high pressure fluid to the treatment chamber while assuring substantially unidirectional flow of the fluid concurrent with the filamentary material therein. Further objects and advantages of the invention will be apparent from the drawing and the description thereof hereinafter.

In the drawing, illustrative of the invention,

Figure 1 is a vertical elevation showing one embodiment of the invention with the parts arranged for the preliminary threading or lacing up of the filamentary material, Figure 2 shows a portion of an embodiment of Figure 1 with the parts therein arranged in operating position.

For various purposes, it is desired to subject filamentary material to fluids and liquids under pressures above atmospheric. Such procedures find particularly advantageous application to continuous artificial filamentary structures, such as those of cellulose esters and ethers, for example cellulose acetate, of cellulose regenerated from viscose or cuprammonium solutions thereof, of nylons, and of synthetic resins, such as polyvinylidene chloride, polyvinyl chloride, copolymers of vinyl chloride and vinyl acetate, after chlorinated polyvinyl chloride or after-chlorinated copolymers of vinyl chloride and vinyl acetate, as well as those of proteinous material, such as of casein or of soya bean protein. The various fluids or liquids with which the filamentary materials are treated include water, superheated water, steam, and various organic liquids or vapors which may be either inert or capable of exerting some plasticizing action upon the filamentary material. Though it will be apparent that the method and apparatus of the invention is applicable for performing numerous processes involving the action of gases, vapors and liquids upon filamentary material running continuously therethrough, such as chemical reaction therewith, washing impurities therefrom, applying a superficial coating thereto, impregnating the filamentary material with a gas or liquid, or more or less superficially plasticizing, swelling and softening the filamentary material, the method and apparatus will be hereinafter described in connection with the application of a heating fluid while the filamentary material is subjected to stretching. It is to be understood, however, that the description of the invention as applied to this particular procedure is merely illustrative of the scope of applicability of the method and device herein set forth.

Filamentary material of polyvinyl resins, such as that made of the copolymer of vinyl acetate and vinyl chloride, is commonly stretched at high temperatures in order to increase its strength. It has been found desirable to effect the heating of the filamentary material by superheated water, that is water heated above its boiling point at normal atmospheric conditions. One of the problems involved is that of maintaining the superheated water within the treating chamber while passing the filamentary material continuously therethrough without at the same time encountering difficulties as the result of spontaneous ebullition of the superheated water and escape of steam into the surrounding atmosphere.

As shown in Figure 1, the treating apparatus is supported upon a suitable framework 2 and the filamentary material 3 is fed thereto from above by means of a godet 4 or other suitable guide and is withdrawn therefrom through a slot 5 in a discharge pipe 6 to any suitable godet arrangement which may comprise the two godets 7 and 8, one of which 8 is tilted so that its axis lies in the same plane as that of the other godet 7 but is inclined somewhat thereto. If stretching of the filamentary material as it passes through the device is desired, the two godets 7 and 8 by which it is withdrawn therefrom are rotated positively at a speed in excess of that of the godet 4 above the device, the extent of stretch depending upon the differential in these two peripheral speeds. The filamentary material may be wrapped one or more times about the godets to prevent slipping.

The treatment chamber comprises an elongated tube 9 of any desired length which connects with ports 10 and 11 formed within upper and lower header blocks 12 and 13 respectively. The device is supported by suitable fastenings upon these header blocks, such as the pins 14 which may be inserted into slots 15 within the frame 2. As shown in Figure 1, the passages within the upper header block are turned to a position for threading or lacing up the device. A lacing liquid enters into a sort of injector nozzle 16 by means of the pipe 17 and in the form of a jet it forces the filamentary material, which enters by an orifice 18, through a central channel 19 within a cock or valve 20 which connects the entrance port 21 within the header 12 with the port 10 which communicates with the treatment chamber 9. As shown, the channel 19 is wide open with respect to both of ports 21 and 10. The filamentary material passes through the port 11 within the lower header 13 into a pipe 22 which opens into the discharge pipe 6. Preferably, the inside of the lower end of this pipe 22 is flared as at 23 to present a smooth surface so that as the filamentary material passes out of the pipe, a less abrupt flexing takes place and wearing is reduced. At the same time, substantially all liquids and fluids discharged from the pipe 22, leave it in the form of a jet the body of which does not strike the walls of the discharge pipe 6 until it is below the end of the slot 5 through which the filamentary material passes to the godets 7 and 8, thereby avoiding the discharge of any substantial amount of treating liquids or fluids upon these godets.

After the device has been threaded, the cock 20 in the upper header is turned to the position shown in Figure 2 in which the central channel 19 of the cock still connects with the inlet port 21 so that communication with the filamentary material inlet 18 is uninterrupted. However, the cock is turned so that only sufficient opening between its central channel 19 and the port 10 remains to permit the filamentary material to pass freely therethrough on its way to the liquid treatment chamber 9. In this position, however, the central channel 19 of the cock communicates with a second port 24 in the upper block 12. This second port 24 communicates with an auxiliary conduit 25 which communicates with a port 26 connected to a chamber 27 within the lower header 13 which communicates with the port 11 at the lower end of the treatment chamber 9. In addition, a pipe 28 is connected to this chamber 27 within the lower header so that additional cooling liquid may be supplied at this point. Preferably, the port 11 within the lower header communicating with the treatment chamber 9 is formed with a tubular extension 29 extending into the chamber 27 within the header so that a substantially unidirectional flow of the fluids and liquids is obtained upon mixing thereof at this point. If desired, the extension 29 may taper to somewhat restrict its opening into the chamber 27, though this is not necessary.

Referring again to Figure 2, the upper header is provided with a port 30 having a pipe 31 for supplying it with the treating liquid or fluid. During operation, an auxiliary channel 32 within the cock 20 directs the fluid supplied by the pipe 31 into the upper end of the treatment chamber 9. However, during lacing, this auxiliary channel 32 within the cock is so positioned that it makes no communication with any port other than 30 communicating with the supply pipe 31. The handle for manipulating the cock may be provided with a pointer for cooperation with suitable indices to indicate the lacing and operating positions.

After the device has been laced up in the manner hereinbefore described during which hot water of about 90° C. temperature may be supplied by pipe 17, the cock 20 is turned from the position in Figure 1 into the position of Figure 2 and the same heated water that was used for lacing the device may continue to be supplied to act as a seal by cooling any superheated water which would otherwise tend to escape by the narrow inlet afforded to the filamentary material between the channel 19 and port 10 as shown in the position of Figure 2. Superheated water, such as at a temperature of 120° C. enters by means of the pipe 31 and is directed into the treatment chamber in substantially the same direction as the filamentary material. The same liquid which serves as a seal at the entrance end of the treatment chamber is then conducted by means of the pipe 25 to the chamber 27 within the lower header where it serves the purpose of sealing the lower end of the device, that is, it mixes with the superheated water to cool it to a temperature below the boiling point at normal atmospheric pressure. Where necessary or desired, additional cooling water may be supplied to the lower seal by way of the pipe 28.

The arrangement thus provides a system which is readily laced, in which the lacing liquid may also be used for sealing both ends of the treatment chamber, and in which the mixing of the sealing fluid or liquid with the treatment liquid at the entrance to the treatment chamber is reduced to a minimum so that the effect of the sealing liquid upon the temperature of the treatment liquid is minimized, thereby conserving upon the heat required to operate the device.

While only one device is shown in the drawing, a plurality of such devices may be arranged side by side or in tiers upon a common framework to form a unified treatment machine for handling a plurality of filamentary strands.

Certain features disclosed herein are disclosed and claimed in copending application Serial No. 414,326 filed October 9, 1941, by the present inventor and another.

While a preferred embodiment of the invention has been disclosed, the description is intended to be illustrative only, and it is to be understood that changes and variations may be made without departing from the spirit and scope of the invention as defined by the appended claims.

I claim:

1. In the method of treating filamentary material with fluids, the steps of continuously passing the filamentary material into a treatment zone through a restricted opening, supplying a treating fluid to the treatment zone, supplying a fluid under pressure outside the restricted opening to oppose the escape of the treating fluid therethrough and directing the pressure fluid to the exit of the treatment zone to mix with the treating fluid as it is discharged therefrom.

2. In the method of treating filamentary material with fluids, the steps of lacing the filamentary material into a treating zone by applying a liquid stream thereto, continuing to apply the stream but diverting the body of the stream from entering the treating zone and introducing a treating fluid into the zone in the same general direction.

3. In the method of treating filamentary material with fluids, the steps of lacing the filamentary material into a treating zone through its entrance by applying a liquid stream thereto, then diverting the body of the liquid stream in a manner to direct it across the outside of the entrance to oppose the escape of the treating fluid therethrough while introducing a treating fluid into the zone adjacent the point of entrance of the filamentary material, and then conducting the diverted liquid stream to the exit of the treating zone to mix with the fluid as it is discharged therefrom.

4. In the method of treating filamentary material with fluids, the steps of continuously passing the filamentary material into a treatment zone through a restricted opening, supplying a superheated liquid to the treatment zone, forcing a stream of a liquid heated below its boiling point across the outside of the restricted opening to oppose the escape of the superheated liquid therethrough and then directing the second liquid to the exit of the treatment zone to mix with the superheated liquid as it is discharged therefrom.

5. In the method of treating filamentary material with fluids, the steps of continuously passing the filamentary material into a treatment zone through a restricted opening, supplying a superheated liquid to the treatment zone, forcing a stream of a liquid below its boiling point across the outside of the restricted opening to oppose the escape of the superheated liquid therethrough and then directing the second liquid to the exit of the treatment zone to mix with the liquid as it is discharged therefrom, and mixing additional liquid with the second liquid prior to its mixing with the treatment liquid.

6. In the method of treating filamentary material with fluids, the steps of lacing the filamentary material into a treating zone by applying a heated liquid stream thereto, then diverting the body of the liquid stream from entering the treating zone in a manner to cause it to flow across the outside of the entrance thereto for the filamentary material while introducing a treating fluid into the zone at a point adjacent to the entrance for the filamentary material.

7. In the method of treating filamentary material with fluids, the steps of lacing the filamentary material into a treating zone by applying a liquid stream thereto, then diverting the body of the liquid stream from entering the treating zone by restricting the opening thereto for the filamentary material, thus causing the liquid stream to flow across the outside of the restricted opening to oppose the escape of the treatment fluid therethrough, introducing superheated liquid into the zone from a position adjacent to the restricted opening substantially simultaneously with the restriction thereof, directing the first liquid to the exit of the treating zone, mixing it with additional liquid below its boiling point and introducing the mixture to the superheated liquid as it is discharged from the treating zone.

8. In apparatus of the character described, a chamber having a restricted entrance and an exit, means for continuously passing filamentary material to be treated through said chamber, means for supplying a treating fluid to the chamber, means for supplying a second fluid under pressure outside of the restricted entrance to oppose the escape of the treating fluid therethrough and means for directing the second fluid to the exit of said chamber.

9. In apparatus of the character described, a chamber having an entrance and an exit, means for directing a fluid stream into said entrance for leading the end of a strand of filamentary material into the chamber, means for drawing the strand continuously through the chamber during operation, means for diverting the main portion of the body of said fluid stream from said entrance during operation into a channel communicating with the exit of the chamber, and means for directing a treatment fluid into a portion of the entrance adjacent the path of the filamentary strand as it enters the chamber.

10. In apparatus of the character described, a chamber having an entrance and an exit, a conduit associated with the entrance for directing a treating fluid into said chamber, a second conduit associated with the entrance for introducing the filamentary strand into the chamber by a fluid stream therethrough, means for connecting the latter conduit alone to the entrance for lacing up and means for connecting the former conduit to the entrance and for restricting the interconnection between the entrance and the former conduit to permit free passage of the filamentary strand and of the treating fluid into the chamber while diverting the main body of the former fluid from the entrance.

11. In apparatus of the character described, a chamber having an entrance and an exit, a conduit associated with the entrance for directing the treating fluid into said chamber, a second conduit associated with the entrance for introducing the filamentary strand by a fluid stream therethrough, means for connecting the latter conduit alone to the entrance for lacing up and means for connecting the former conduit to the entrance and for restricting the interconnection between the entrance and the former conduit to permit free passage of the filamentary strand and of the treating fluid into the chamber while diverting the main body of the former fluid from the entrance, and a third conduit arranged to receive the diverted fluid and to direct it to the exit of the chamber.

12. In apparatus of the character described, a chamber having an entrance and an exit, a cock at the entrance of the chamber having two passages, one of said passages being arranged to connect the entrance with a treatment fluid supply port, the other being arranged to connect the entrance with a lacing and sealing fluid supply port, both passages being further arranged so that after lacing, the turning of the cock to introduce the treatment fluid restricts the intercommunication between the second passage and the entrance to divert the main body of the lacing and sealing fluid from the entrance while still permitting free passage of the filamentary material.

13. In apparatus of the character described, a chamber having an entrance and an exit, a cock at the entrance of the chamber having two passages, one of said passages being arranged to connect the entrance with a treatment fluid supply port, the other being arranged to connect the entrance with a lacing and sealing fluid supply port, both passages being further arranged so that after lacing, the turning of the cock to introduce the treatment fluid restricts the intercommunication between the second passage and the entrance to divert the main body of the lacing and sealing fluid from the entrance while still permitting free passage of the filamentary material, and a conduit arranged to receive the diverted fluid and to direct it to the exit of the chamber.

ALVIN LODGE.